United States Patent [19]
LaRose et al.

[11] Patent Number: 5,851,586
[45] Date of Patent: *Dec. 22, 1998

[54] PROCESS FOR PRODUCING POLYMER FILMS FROM AQUEOUS POLYMER COMPOSITIONS

[75] Inventors: Joseph Arthur LaRose, Ravenna, Ohio; Eric Alan Overholt, Bath, Pa.; Lawrence Joseph Schnieders, Eastlake, Ohio

[73] Assignee: Avery Dennison Corporation, Pasadena, Calif.

[*] Notice: The term of this patent shall not extend beyond the expiration date of Pat. No. 5,716,669.

[21] Appl. No.: 966,255

[22] Filed: Nov. 7, 1997

Related U.S. Application Data

[63] Continuation of Ser. No. 824,316, Mar. 26, 1997, Pat. No. 5,716,669.

[51] Int. Cl.⁶ ...................................................... B05D 5/10
[52] U.S. Cl. ..................................... 427/208.4; 425/381.2; 427/294; 427/430.1
[58] Field of Search ................................ 427/208.4, 294, 427/430.1; 425/381.2

[56] References Cited

U.S. PATENT DOCUMENTS

| | | | |
|---|---|---|---|
| 4,065,532 | 12/1977 | Wild et al. | 264/68 |
| 4,906,421 | 3/1990 | Plamthottam et al. | 264/22 |
| 5,100,728 | 3/1992 | Plamthottam et al. | 428/345 |
| 5,716,669 | 2/1998 | LaRose et al. | 427/208.4 |

*Primary Examiner*—Bernard Pianalto
*Attorney, Agent, or Firm*—Renner, Otto, Boisselle & Sklar

[57] ABSTRACT

The present invention relates to a process for producing a polymer film from an aqueous polymer composition wherein the process comprises the steps of: (A) introducing an aqueous composition comprising water and a polymer through at least one feed unit in one or more upstream sections of an extruder comprising a plurality of interconnecting sections wherein at least one downstream section comprises a homogenizer mixer; (B) conveying the composition through the extruder; (C) maintaining the composition at a temperature of from about 60° C. to about 160° C. as it is conveyed through the extruder; (D) reducing the pressure in at least one section of the extruder downstream of the feed units sufficiently to evaporate at least a portion of the water in the composition conveyed through that section; (E) removing the evaporated water from the extruder through at least one vent in a downstream section to form a water-reduced composition; and (F) extruding the water-reduced composition through a die thereby to produce a film.

In other embodiments, the invention relates to a process for producing sheets of a pressure-sensitive adhesive composition and to a process for coating a composition such as a pressure-sensitive adhesive composition onto a support web. In each of the embodiments of the invention, a film, sheet or coating composition is formed from an aqueous composition containing large amounts of water, and the product obtained is essentially water-free.

26 Claims, 2 Drawing Sheets

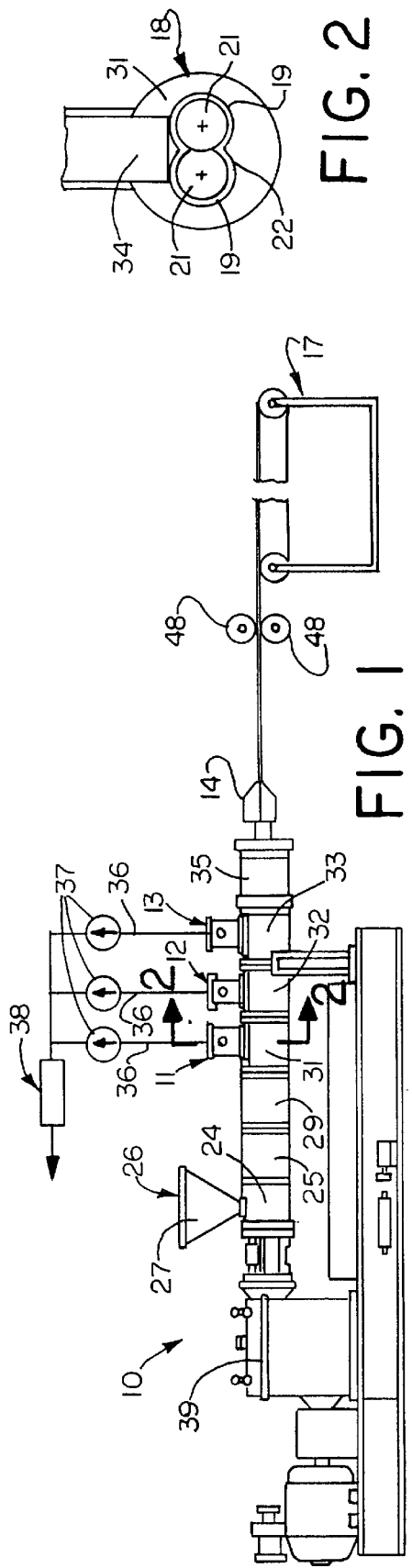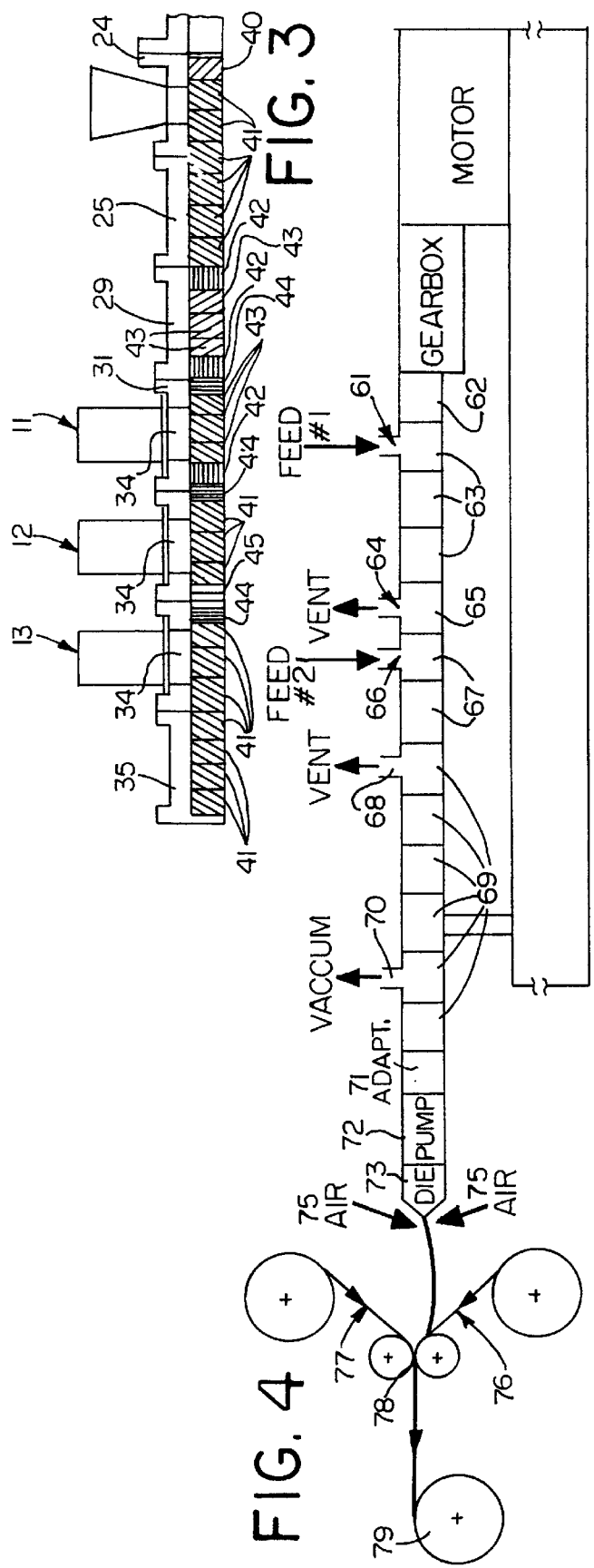

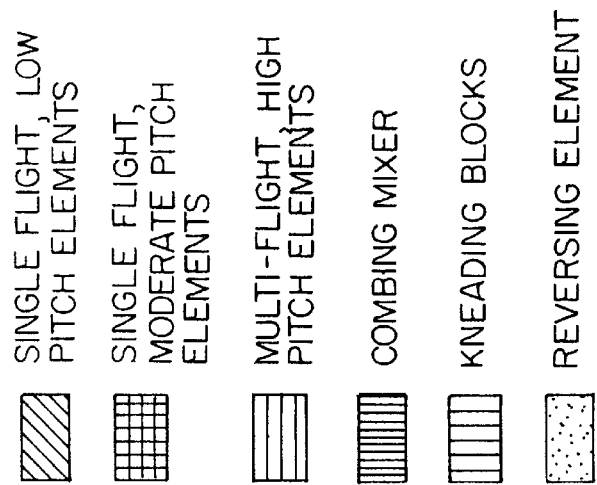
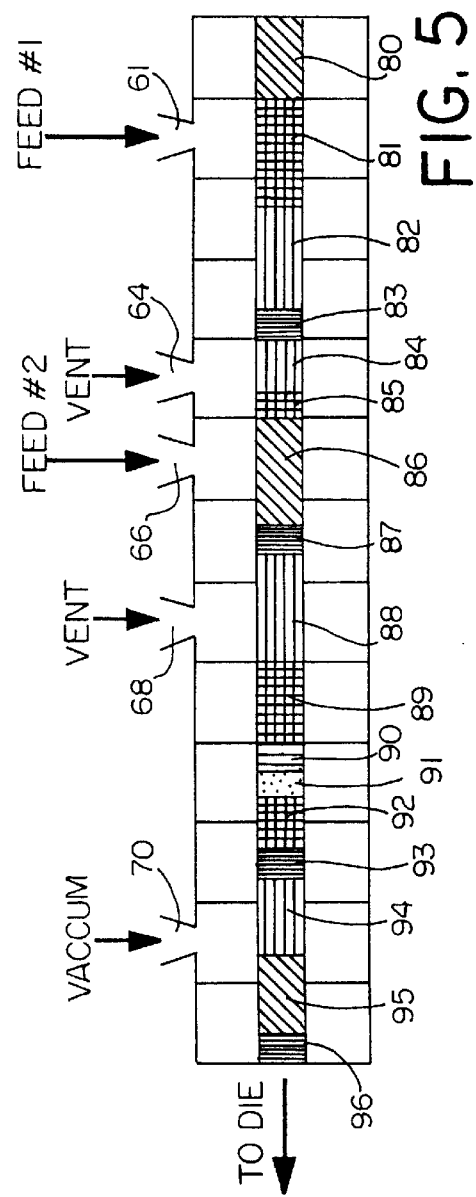
FIG. 5

PROCESS FOR PRODUCING POLYMER FILMS FROM AQUEOUS POLYMER COMPOSITIONS

This is a continuation of application Ser. No. 08/824,316, filed Mar. 26, 1997, U.S. Pat. No. 5,716,669.

FIELD OF THE INVENTION

This invention relates to polymer films prepared from aqueous polymer compositions and more particularly to films or sheets of pressure-sensitive adhesive compositions. The invention also relates to the process for coating polymer compositions onto a support web, and more particularly, to a process for producing a coating of a pressure-sensitive adhesive composition onto a support web.

BACKGROUND OF THE INVENTION

Polymers are generally manufactured by polymerization or polycondensation of the monomers in bulk, solution, emulsion, suspension or dispersion. When it is desired to utilize the polymers, it is necessary to remove unconverted monomers, solvents or liquid carriers such as water as completely as possible. The volatilization of the solutions and dispersions has to be carried out under mild conditions since otherwise heat-sensitive polymers may undergo partial decomposition leading to discoloration or the formation of dark specs in the polymer. It is also advantageous to admix desired additives into the polymer simultaneously with a devolatilization treatment so as to avoid having to melt the polymer an additional time.

U.S. Pat. No. 4,065,532 (Wild et al) describes a process for admixing additives into plastics with a simultaneous removal of volatile constituents. The process utilizes a horizontal devolatilizing extruder U.S. Pat. Nos. 4,906,421 and 5,100,728 describe high-performance pressure-sensitive adhesive tapes and a process for making the same. The process includes preparing an adhesive composition containing electron beam-curable pressure-sensitive adhesive polymer matrix, fillers and solvent, and thereafter the composition is introduced and conveyed through a twin screw extruder where the solvent is removed in one or more solvent removal units. A solvent-free composition is extruded as the carrier layer.

SUMMARY OF THE INVENTION

The present invention relates to a process for producing a polymer film from an aqueous polymer composition wherein the process comprises the steps of: (A) introducing an aqueous composition comprising water and a polymer through at least one feed unit in one or more upstream sections of an extruder comprising a plurality of interconnecting sections wherein at least one downstream section comprises a homogenizer mixer; (B) conveying the composition through the extruder; (C) maintaining the composition at a temperature of from about 60° C. to about 160° C. as it is conveyed through the extruder; (D) reducing the pressure in at least one section of the extruder downstream of the feed units sufficiently to evaporate at least a portion of the water in the composition conveyed through that section; (E) removing the evaporated water from the extruder through at least one vent in a downstream section to form a water-reduced composition; and (F) extruding the water-reduced composition through a die thereby to produce a film.

In other embodiments, the invention relates to a process for producing sheets of a pressure-sensitive adhesive composition and to a process for coating a composition such as a pressure-sensitive adhesive composition onto a support web. In each of the embodiments of the invention, a film, sheet or coating composition is formed from an aqueous composition containing large amounts of water, and the product obtained is essentially water-free.

BRIEF DESCRIPTION OF THE DRAWINGS

The features and advantages of the present invention will be better understood by reference to the following detailed descriptions when considered in conjunction with the accompanying drawings wherein:

FIG. 1 is a longitudinal cross-sectional view of an extruder useful in the present invention;

FIG. 2 is a transverse cross-sectional view of the extruder of FIG. 1 taken through lines 2—2;

FIG. 3 is a schematic view of the extruder barrel of FIG. 1 showing one preferred screw profile;

FIG. 4 is a longitudinal cross-sectional view of another extruder useful in the present invention; and FIG. 5 is a schematic view of the extruder barrel of FIG. 4 showing another preferred screw profile.

DETAILED DESCRIPTION OF THE INVENTION

The present invention provides fully devolatilized (less than 1% by weight of volatiles) polymer compositions that are extruded to form polymer films and which may be extruded onto support webs such as flexible paper, film, cloth, etc. The fully devolatilized polymer compositions are prepared from aqueous polymer compositions containing large amounts of water such as from about 20% to about 60% by weight of water. Examples of aqueous polymer compositions which can be utilized in the process of the present invention include water-based acrylic-based polymer compositions, and aqueous rubber-base polymer compositions. In one preferred embodiment, the polymer composition is an aqueous mixture of a pressure-sensitive adhesive which may be an acrylic-based polymer matrix or a rubber-based polymer matrix adhesive. The aqueous polymer compositions generally constitute from about 40% to about 80% by weight of a polymer with the balance being made up of water and minor amounts of volatile organic compounds and unreacted monomer surfactants, tackifiers, etc.

The aqueous acrylic-based polymers that can be devolatilized in accordance with the process of the present invention may comprise homopolymers and copolymers of various acrylic monomers including alkyl acrylates such as ethyl acrylate, butyl acrylate, propyl acrylate, 2-ethylhexyl acrylate, isooctyl acrylate, isodecyl acrylate, etc.; alkyl methacrylates such as methyl methacrylate, ethyl methacrylate, butyl methacrylate, etc. These acrylate monomers may be copolymerized with vinyl-unsaturated monomers such as vinyl acetate, vinyl propionate; styrenic monomers such as styrene, methyl styrene, etc.; unsaturated carboxylic acids such as acrylic acid, methacrylic acid, itaconic acid, maleic acid, fumaric acid, etc.; acrylamide, vinyl caprolactam, etc.

The rubber-based pressure-sensitive adhesive polymer matrices useful in the process of the present invention are normally pressure-sensitive adhesive matrices based on styrene and butadiene random polymers and mixtures thereof.

The aqueous polymer compositions used in the present invention may contain from about 20% to about 60% by weight or more of water. More often, the aqueous compositions contain from about 30% to about 60% more often from about 40% to about 60% by weight of water.

The removal of the liquid phase of the aqueous polymer compositions is accomplished through the use of an extruder, and more often, a twin screw extruder comprising a housing or barrel having a pair of side-by-side generally parallel and cylindrical overlapping bores, forming a barrel chamber in which a pair of rotating, intermeshing screws are mounted. The pair of intermeshing screws may be co-rotating or counter-rotating, although in one preferred embodiment, the intermeshing screws are counter-rotating.

The barrel chamber comprises multiple sections which may enclose the entire barrel or which may have multiple openings for feeding and venting. The sections of the barrel can be heated or cooled so that the composition inside the barrel can be maintained at a desired temperature. The screw elements within each section of the barrel are comprised of multiple elements that are designed to perform certain functions such as mixing, homogenizing, conveying, degassing, building and lowering pressure, etc. The selection and arrangement of the barrel sections is made in conjunction with the selection and arrangement of the screw elements to perform certain tasks in the desired sequence.

The process of the invention generally involves introducing the aqueous composition into an extruder, and the composition is conveyed through the extruder by the rotating screws. The aqueous composition is introduced to the extruder through at least one feed unit. The use of multiple feed units (e.g., 2 or 3) is preferred for better utilization of the capacity of the extruder. While in the extruder, the composition is blended, and water is removed by evaporation in one or more water removal units and then vented to the atmosphere or recovered. An essentially water-free composition is then extruded from the extruder. As used herein, the term "water-free" means a composition having less than about 1% by weight and more often less than 0.5% or even 0.1% by weight of volatile material (e.g., water).

As the aqueous composition is conveyed downstream in the extruder, it is heated by the mechanical action and by the external application of heat when desired. The mechanical action of the screw elements ensures thorough blending or mixing of the material as it is conveyed through the extruder. Through the heating of the material accomplished by the external source or by the heat generated from the shearing of the material by the screw elements, the aqueous phase is vaporized and is exhausted through one or more openings (vents) in the barrel. A vacuum may be applied at one or more of these openings to facilitate removal of the water. The uniform action of the screw elements ensures the uniform heating of the material and it also ensures that sufficient surface area of the material is exposed to allow vaporization of the liquid.

Because the aqueous compositions utilized in the process of the present invention are two-phase systems (a water-insoluble polymer phase and an aqueous phase), a critical feature of the extruder utilized in the process is the presence of one or more screw elements which are effective in finely dividing and then blending the aqueous composition and providing a high rate of surface turnover and homogenization. Thus it is essential that the extruder contain at least one homogenizer mixer section. One example of a preferred screw element for homogenizing the two-phase aqueous composition is a combing mixer element. Combing mixer elements generally are characterized by multiple rows of vanes which are tapered, pitched and intermeshed. In one preferred embodiment, the aqueous compositions pass through a homogenizer mixer element just prior to degassing of the composition. In another preferred embodiment, a homogenizer mixer element is present in the barrel to homogenize the devolatilized composition just prior to entering the die in order to ensure that a continuous phase of devolatilized composition is extruded through the die to form a smooth continuous polymer sheet or film.

In one embodiment, the present invention relates to a process for producing a polymer film from an aqueous polymer composition wherein the process comprises the steps of: (A) introducing an aqueous composition comprising water and a polymer (e.g., a pressure-sensitive adhesive) through at least one feed unit in one upstream section of an extruder comprising a plurality of interconnecting sections wherein at least one downstream section comprises a homogenizer mixer; (B) conveying the composition through the extruder; (C) maintaining the composition at a temperature of from about 60° C. to about 160° C. as it is conveyed through the extruder; (D) reducing the pressure in at least one section of the extruder downstream of the feed unit sufficiently to evaporate at least a portion of the water in the composition conveyed through that section; (E) removing the evaporated water from the extruder through at least one vent in a downstream section to form a water-reduced composition; and (F) extruding the water-reduced composition through a die thereby to produce a film.

In another embodiment, the invention relates to a process for producing sheets of a pressure-sensitive adhesive composition wherein the process comprises: (A) providing an extruder comprising a plurality of interconnecting sections having at least one feed unit in one upstream section, at least one downstream unit comprising a homogenizer mixer, and at least one downstream section below at least one combing unit containing a water removal unit, said downstream water removal unit comprising a barrel section having a vent opening; (B) introducing into the feed unit of the extruder an aqueous adhesive composition comprising water and a pressure-sensitive adhesive polymer; (C) conveying the composition through the extruder; (D) maintaining the adhesive composition at a temperature of from about 60° C. to about 160° C. as it is conveyed through the extruder; (E) reducing the pressure in the barrel section of the water removal unit sufficiently to evaporate and remove at least a portion of the water in the adhesive composition conveyed through that section to form a water-reduced pressure-sensitive adhesive composition; and (F) extruding the water-reduced pressure-sensitive adhesive composition through a sheet die to provide a sheet of the adhesive.

A pressure-sensitive adhesive sheet which is extruded from the die contains less than 1% by weight of total volatile liquid. More often, the total volatile liquid content (primarily water) of the extruded sheet is less than 0.5% and even less than 0.1% by weight. The coating weight of the film or sheet can be controlled by film thickness and the output rate of the extruder.

The extruders which are utilized in the process of the present invention may be any suitable commercially available screw extruder, and particularly, any available twin screw extruder which is modified to include one or more water-removable units and one or more combing or homogenizing elements. For example, extruders manufactured by American Leistritz Extruder Corporation, Sommerville, N.J., have been found to be suitable for use in the practice of this invention when modified as described above.

FIG. 1 schematically illustrates an apparatus suitable for use in practicing the present invention. The apparatus comprises twin screw extruder 10 with three water-removal units 11, 12 and 13 for removing water from the adhesive composition travelling through the extruder 10. A sheet die 14 is mounted at the downstream and of the extruder 10. In this arrangement, a water-free polymer composition can be extruded in the form of a sheet. In the embodiments shown in FIG. 1, the conveying unit 17 is also shown for carrying the extruded sheet material away from the extruder 10. It is understood that the processing of the extruded sheet may be accomplished by any suitable conventional method.

With reference to FIG. 2, the extruder 10 comprises a housing or barrel 18 having a pair of side-by-side generally parallel and cylindrical overlapping bores 19 forming a barrel chamber 22 in which a pair of rotating counterrotating intermeshing screws 21 are mounted. The barrel 18 preferably comprises multiple sections. The combination and arrangement of barrel sections are selected to accomplish specific tasks. The barrel sections may completely enclose the screws or have openings for feeding, venting, etc. Each section of the barrel may be provided with the heating or cooling means so that the material within that barrel section may be heated or cooled to a desired temperature.

Likewise, the screws 21 preferably comprise multiple elements designed to accomplish the particular task such as mixing, homogenizing, conveying, building pressure, etc. The combination and arrangement of screw elements are selected to accomplish the desired task in a particular order. In the embodiment shown in FIGS. 1 and 2, the barrel 18 comprises seven sections. The first section 24 is part of a feeding unit 26 for introducing material into the extruder. The feeding unit 26 comprises a large feed hopper 27 which empties directly into the chamber 22 of the first barrel section 24. While not shown in the drawings, a feeding or metering unit may be provided at the feeding unit 26 to control the rate of flow of material from the hopper 27 into the barrel 18.

The first, second and third water removal units 11, 12 and 13 are located downstream of the feeding unit at the fourth, fifth and sixth barrel sections 31, 32 and 33, respectively. As shown in FIG. 2, the fourth barrel section 31 has a large vent opening 34 at the top of that barrel section. The fifth and sixth barrel sections 32 and 33 are identical to barrel section 31 shown in FIG. 2. A duct 36 extends from the vent opening 34 to a vacuum pump 37 for reducing the atmospheric pressure within the duct 36, vent opening 34 and that barrel section, if desired. In the embodiment shown, each water-removal unit has a separate vacuum pump. It is understood that only one or two of the water-removal units may be joined to a vacuum pump or that more than one water-removal unit may be joined to a single vacuum pump. Water which is removed from the extruder can be collected, for example, by condenser 38.

The invention also relates to a process for coating a composition onto a support web wherein the process comprises the steps of: (A) introducing an aqueous composition comprising water and a polymer (e.g., a pressure-sensitive adhesive) through a feed unit in one upstream section of an extruder comprising a plurality of interconnecting sections wherein at least one downstream section comprises a homogenizer mixer; (B) conveying the composition through the extruder; (C) maintaining the composition at a temperature of from about 60° C. to about 160° C. as it is conveyed through the extruder; (D) reducing the pressure in at least one section of the extruder downstream of the feed unit sufficiently to evaporate at least a portion of the water in the composition conveyed through that section; (E) removing the evaporated water from the extruder through at least one vent in a downstream section to form a water-reduced composition; and (F) extruding the water-reduced composition onto a support web to thereby provide a uniform coating of polymer on the support web.

In yet another embodiment, the invention relates to a process of extruding a pressure-sensitive adhesive composition onto a support web wherein the process comprises: (A) providing an extruder comprising a plurality of interconnecting sections and having at least one upstream section containing a feed unit, at least one downstream section comprising a homogenizer mixer, and at least one downstream section below the combing mixer containing a water removal unit, said downstream water removal unit comprising a barrel section having a vent opening, a vacuum pump, and a duct surrounding the vent opening and extending from the barrel section to the vacuum pump; (B) introducing into the feed unit of the extruder an aqueous pressure-sensitive adhesive composition comprising water and a pressure-sensitive adhesive polymer, said water being present in an amount of from about 20% to about 60% by weight of the adhesive composition; (C) conveying the composition through the extruder; (D) maintaining the adhesive composition at a temperature of from about 60° to about 160° C. as it is conveyed through the extruder; and (E) activating the vacuum pump to reduce the pressure in the barrel section of the water removal unit sufficiently to evaporate at least a portion of the water in the adhesive composition conveyed through that section to form a water-reduced adhesive composition; and (F) extruding the pressure-sensitive adhesive composition through a die onto a support web to provide a uniform coating of pressure-sensitive adhesive on the support web.

FIG. 3 shows a screw profile suitable for use in the screw extruder of FIG. 1. In the first barrel section 24, the screws 21 have a return scroll element 40 which prevents material from back flowing into the drive unit 39 (FIG. 1). The portions of the screws 21 extending through the remainder of the first barrel section 24, where the material is introduced into the extruder 10, and the second barrel section 25, comprise open chamber conveying elements 41 which rapidly transport the material downstream. Conveying elements 41 have very thin flights and therefore tend not to generate a significant amount of back pressure.

In the third barrel section 29, the screws 21 are designed to build pressure and mix the aqueous composition. In the embodiment shown, this is accomplished with mixing elements 42 followed by closed chamber conveying elements 43 having large, thick flights. The conveying element 43 are followed by another series of mixing elements 42 and then combing mixer 44. The combing mixer 44 homogenizes the composition before it enters conveying element 44.

Material is conveyed rapidly through the fourth barrel section 31 and past vent opening 34 by a series of open chamber conveying elements 41. Such an arrangement maximizes the surface area of the material traveling through the fourth barrel section 31 and hence maximizes the removal of water by the first water removal unit 11.

At about the beginning of the fifth barrel section 32, before the next vent opening 34, the screws 21 comprise another series of mixing elements 42 followed by another combing mixer 44.

Material passing through combing mixer 44 is again carried rapidly past the vent opening 34 by open chamber conveying elements 41. Again, the arrangement maximizes the surface area of the material exposed to the atmosphere in the fifth barrel section 32 and hence maximizes water removal.

A similar arrangement of screw elements is provided in the sixth barrel section 33 except that kneading elements 45 are preferably used rather than mixing elements 42. The kneading elements in combination with a combing mixer 44 build pressure but also tend to remove any last traces of air bubbles in the composition. In the seventh barrel section 35, the screw 21 comprises open chamber conveying elements 41 which convey the material to the die.

The above screw profile provides an arrangement wherein back pressure is built up before each vent opening and then released as the material travels past the vent opening 34 to expose as much of the adhesive compositions as possible to the atmosphere. While such an arrangement is presently preferred, it is understood that other arrangements may be used. It is also understood that other screw elements may be used to provide the desired pressure changes within the extruder.

The screw profile is preferably designed to maximize the surface area of the composition passing through the barrel sections of the water removal units. In addition to the surface area, water removal is dependent on the temperature of the composition, the atmospheric pressure within that barrel section and the residence time of the composition within that barrel section which, in turn, depends on the feed rate.

For a given feed rate, temperature and pressure are adjusted to maximize solvent removal without drawing any of the composition through the vent opening. Elevated temperatures in the range of from about 60° C. to about 160° C. in combination with pressures of about 1500 millibars or less are presently preferred, and pressures of about 1000 millibars or less are more preferred.

FIG. 4 illustrates a preferred embodiment of the invention in which a counter-rotating twin screw extruder is used to produce a film of a pressure-sensitive adhesive. Counter-rotation of the screws is preferred as this provides a higher degree of surface turnover and film splitting within the extruder. Wet pressure-sensitive adhesive is introduced into feeding port 61 in a controlled continuous fashion. It is understood that the wet pressure-sensitive adhesive may be at ambient temperature or cooler when so introduced, or may be warmed prior to introduction, possibly by bringing the exhausted volatile component from the process in close proximity with the feed stream of the pressure-sensitive adhesive in a heat exchange device. The pressure-sensitive adhesive is fed into the extruder one barrel segment downstream from the upstream end. This barrel segment 62 at the upstream end provides an opportunity for the screw elements to generate forward (downstream) pressure, thus preventing the liquid from leaking upstream into the gearbox. No advantage has been identified with heating segment 62. The temperature of the pressure-sensitive adhesive stream is increased in the next three barrel segments 63 by a step-wise increase in barrel segment temperatures over the three zones 63. Typical temperatures in these zones for acrylic based polymer matrix would be 100° C. to 180° C., and 80° C. to 120° C. for rubber based polymer matrix. Vapor is exhausted to atmosphere through vent 64, though it is understood that the vapor from this and other vents on the extruder could be captured for further processing including energy recovery, waste treatment, and the like. A vacuum can be applied to facilitate water vapor removal, and the water vapor can be collected or released to the atmosphere. The temperature in barrel segment 65 can be set lower than the upstream segment to allow the pressure-sensitive adhesive stream to cool slightly, which could aid in keeping liquid from boiling out of the vent. At this point in the process, the pressure-sensitive adhesive stream is substantially devolatilized, though not yet less than 1% by weight liquid.

A second stream of wet pressure-sensitive adhesive is introduced into the downstream feeding port 66 in a controlled continuous fashion. As with the upstream feed, it is understood that the wet pressure-sensitive adhesive may be at ambient temperature or cooler when so introduced, or may be warmed prior to introduction. The pressure-sensitive adhesive stream is conveyed downstream through barrel segments 67, where it is heated to approximately 140° C. for both acrylic based polymer matrices and rubber based polymer matrices. Vapor is exhausted at a second, downstream vent 68. While this embodiment of the invention utilizes a single barrel segment between feed 66, and vent 68, it is understood that some advantage exists to including one or more additional barrel segments between feed 66 and vent 68. Such advantage could be the additional distance over which to establish the proper temperature and pressure in the pressure-sensitive adhesive stream to optimize the function of vent 68.

The pressure-sensitive adhesive is conveyed downstream in barrel segments 69, which are maintained at a temperature lower than the previous barrel segments to avoid overheating the pressure-sensitive adhesive stream. Typical temperatures for barrel segments 69 range from 100° C. to 140° C. for both acrylic based and rubber based pressure-sensitive adhesive. A vacuum 70 is applied one barrel segment upstream from the downstream end of the screw to complete the devolatilization of the pressure-sensitive adhesive. After the application of the vacuum, the pressure-sensitive adhesive is less than 1% by weight volatile components. More often, the adhesive will contain less than 0.5% or less than 0.1% by weight of volatile components. Vacuum as great as 1000 mbar can be used to complete the devolatilization.

The devolatilized pressure-sensitive adhesive stream is conveyed by upstream fluid pressure through adapter 71, into a gear pump 72, which forces the pressure-sensitive adhesive through die 73, where it emerges as a sheet 74, typically less than 1 mil to over 10 mils in thickness. Typically, the pressure-sensitive adhesive sheet emerges at a melt temperature of 100° C. to 120° C., though 110° C. has been demonstrated to be an optimum value. Ambient air 75 is blown on both sides of the pressure-sensitive adhesive sheet at or near the exit of the die to cool the pressure-sensitive adhesive sheet, thereby increasing the strength and extensibility of the sheet. Uniform air flow across the width of the sheet as well as on both sides of the sheet is critical to insuring uniform cooling of the pressure-sensitive adhesive sheet. The pressure-sensitive adhesive sheet can be allowed to transverse an unsupported span between the die 73 and the web 76 as little as less than one inch and up to 24 or more. The maximum length of the span is dependent upon the temperature of the pressure-sensitive adhesive sheet at the die 73 exit, the amount of cooling achieved by the air 75, and the extensibility of the pressure-sensitive adhesive.

The mass of pressure-sensitive adhesive per unit area as applied to web 76 can be controlled by the thickness of the pressure-sensitive adhesive sheet at the exit of the die 73, the feed rate of liquid pressure-sensitive adhesive into the extruder at feed ports 61 and 66, as well as the speed of the web 76. The exit mass flow rate of the pressure-sensitive adhesive from the extruder is directly and solely controlled by the liquid feed rate through feed ports 61 and 66. As the velocity of the web 76 is increased relative to the mass rate of the pressure-sensitive adhesive exiting the die, the pressure-sensitive adhesive sheet is stretched longitudinally. This stretching reduces the thickness of the pressure-sensitive adhesive sheet, thereby decreasing the mass of the adhesive per unit area as the pressure-sensitive adhesive sheet is applied to the web 76. Alternatively, the die can be configured to extrude a film of the desired thickness.

Once the pressure-sensitive adhesive sheet 74 is applied to the web 76, the adhesive is laminated to the second web 77 at the laminating nip 78. The second web 77 is typically a release coated web, though it is understood that the second web 77 may be material that is not release coated. The laminated material is then wound into a roll 79, which is available for further processing as the particular use may require.

FIG. 5 is an expanded view of a barrel and internal screw design of FIG. 4. Liquid pressure-sensitive adhesive is introduced into the extruder barrel through the feed port 61 as described above. Screw element 80 is a single flight, low pitch (e.g., 6 degrees), close-cut, tightly intermeshed element (90 mm in length) designed to develop downstream pressure on the liquid pressure-sensitive adhesive to prevent liquid from flowing upstream to the gearbox seals. Element 81 is a single flight, close-cut, tightly intermeshed element (180 mm in length) of moderate pitch (12 degrees) designed to not only build pressure to move material downstream, but also to develop some shear of the material against the interior barrel wall. Element 82 is a multi-flight (2), high pitch (e.g., 30 degrees), tightly intermeshed element (120 mm in length) that generates high downstream pressure to push the pressure-sensitive adhesive into the combing mixer or homogenizer element 83. The combing mixer element features multiple rows of pitched, tapered vanes that chop and blend the material stream, thus providing a high rate of surface turnover and material homogenization. The combing or homogenizer mixer 83 has 5 rows, 8 vanes per row, 3.5 mm clearance between vanes, 0.2 mm clearance between vane tip and barrel wall, a 120 degree pitch and is 30 mm in length. Following the mixer is a set of three flight elements 84 having a pitch of 45 degrees and a length of 180 mm which creates a region of lower pressure immediately downstream of the combing mixer elements 83. This has the effect of promoting the downstream flow of the pressure-sensitive adhesive material out of the combing mixer. Additionally, the multiple flights have the effect of creating a larger percentage of open volume in the screw, which allows the vaporized liquid phase to degas out of the pressure-sensitive adhesive stream and exit the extruder through the vent 64.

A set of single flight, moderate pitch (12 degrees), tightly intermeshed elements (60 mm in length) 85 then convey the material to the barrel section containing second feed port 66. Additional liquid pressure-sensitive adhesive is introduced, and a set of single flight, low pitch (e.g., 6 degrees), tightly meshed elements 86 (120 mm in length) are used to develop downstream pressure in the material, pushing it into a second set of combing mixer elements 87 which are of the same design as combing mixer elements 83. As before, a three flight, high pitch (45 degrees), tightly intermeshed element (120 mm in length) is used to draw material out of the combing mixer and to allow vapor to degas from the material and exit the extruder through the second vent 68. The pressure-sensitive adhesive is then conveyed by single flight, moderate pitch (20 degrees), tightly meshed elements 89 which is 120 mm in length into a set of multi-lobe, neutral pitch kneading block 90 which generate high shear and a high degree of mixing in the material. The kneading blocks 90 have two segments, two lobes per segment, a 90 degree pitch, and each segment is 10 mm long. Immediately downstream of the kneading blocks is a reverse pitch element 91 designed to push material back upstream to the kneading block 90. The reversing element 91 contains six lobes and no slots, has a 0.5 mm clearance between the top of the lobe and the barrel wall, and is 30 mm in length. The combination of these two elements establishes a high shear, high residence time region as material recirculates between the kneading blocks 90 and the reversing element 91 before eventually being forced downstream past the reversing element by the overall net downstream pressure of the material. Single flight, moderate pitch (12 degrees), tightly meshed elements 92 (90 mm in length) convey material from the reversing element into the combing mixer elements 93 (same design as combing mixer 83) which thoroughly mixes and turns over the material surface exposing the remaining volatile material. When the material is drawn into the lower pressure vacuum section 70 by the three flight, high pitch (45 degrees), tightly meshed elements 94 (120 mm in length) the remaining volatile components, typically water and trace quantities of volatile organic compounds readily flash from the pressure-sensitive adhesive material, leaving the pressure-sensitive adhesive stream with less than 1% by weight volatile components and more often less than 0.5% or even less than 0.1% by weight of volatile components. Single flight, low pitch (6 degrees), tightly meshed elements 95 (60 mm in length) force the devolatilized pressure-sensitive adhesive into a set of combing mixer elements 96 that homogenizes the pressure-sensitive adhesive material and insures that a continuous phase of devolatilized pressure-sensitive adhesive is extruded through the adapter 71, through the gear pump 72, and emerges from the die 73 as a smooth continuous pressure-sensitive adhesive sheet. The combing mixer 96 is of the same design as combing mixer 83.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A process for producing a polymer film from an aqueous polymer composition wherein the process comprises the steps of:

(A) introducing an aqueous composition comprising water and a polymer through at least one feed unit in one upstream section of an extruder comprising a plurality of interconnecting sections wherein at least one downstream section comprises a homogenizer mixer;

(B) conveying the composition through the extruder;

(C) maintaining the composition at a temperature which facilitates vaporization of at least a portion of the water as the composition is conveyed through the extruder;

(D) reducing the pressure in at least one section of the extruder downstream of the feed unit sufficiently to evaporate at least a portion of the water in the composition conveyed through that section;

(E) removing the evaporated water from the extruder through at least one vent in a downstream section to form a water-reduced composition; and (F) extruding the water-reduced composition through a die thereby to produce a film.

2. The process of claim 1 wherein the aqueous composition is an aqueous emulsion or dispersion of a pressure-sensitive adhesive.

3. The process of claim 1 wherein substantially all of the water is removed from the composition so that a water-free composition is extruded.

4. The process of claim 1 wherein a homogenizer mixer is positioned upstream of each vent.

5. The process of claim 4 wherein a homogenizer mixer is positioned upstream of the die.

6. The process of claim 1 wherein the aqueous polymer composition introduced into the extruder in step (A) contains from about 20% to about 60% by weight of water.

7. The process of claim 1 wherein the pressure is reduced in step (D) in at least two downstream sections of the extruder sufficiently to evaporate at least a portion of the water in the composition conveyed through each section.

8. The process of claim 1 wherein the extruder contains a pair of rotating screws.

9. The process of claim 1 wherein the extruder contains a pair of counter-rotating intermeshing screws.

10. A process for producing sheets of a pressure-sensitive adhesive composition, said process comprising:

(A) providing an extruder comprising a plurality of interconnecting sections having at least one feed unit in one upstream section, at least one downstream unit comprising a homogenizer mixer, and at least one downstream section below at least one homogenizer mixer containing a water removal unit, said downstream water removal unit comprising a barrel section having a vent opening;

(B) introducing an aqueous adhesive composition comprising water and a pressure-sensitive adhesive polymer into the feed unit or units of the extruder;

(C) conveying the composition through the extruder;

(D) maintaining the adhesive composition at a temperature which facilitates vaporization of at least a portion of the water as the composition is conveyed through the extruder;

(E) reducing the pressure in the barrel section of the water removal units sufficiently to evaporate and remove at least a portion of the water in the adhesive composition conveyed through that unit to form a water-reduced pressure-sensitive adhesive composition; and (F) extruding the water-reduced pressure-sensitive adhesive composition through a sheet die to provide a sheet of the adhesive.

11. The process of claim 10 wherein the extruder contains a pair of counter-rotating intermeshing screws.

12. The process of claim 10 wherein the aqueous composition introduced into the feed unit or units in step (B) contains from about 20% to about 60% by weight of water.

13. The process of claim 10 wherein the extruded pressure-sensitive adhesive obtained in step (E) is water-free.

14. The process of claim 10 wherein the residual water in the adhesive fed to the die in step (F) is less than about 0.5% by weight.

15. A process for coating a composition onto a support web, said process comprising the steps of:

(A) introducing an aqueous composition comprising water and a polymer through at least one feed unit in one upstream section of an extruder comprising a plurality of interconnecting sections wherein at least one downstream section comprises a homogenizer mixer;

(B) conveying the composition through the extruder;

(C) maintaining the composition at a temperature which facilitates vaporization of at least a portion of the water as the composition is conveyed through the extruder;

(D) reducing the pressure in at least one section of the extruder downstream of the feed unit sufficiently to evaporate at least a portion of the water in the composition conveyed through that section;

(E) removing the evaporated water from the extruder through at least one vent in a downstream section to form a water-reduced composition; and (F) extruding the water-reduced composition onto a support web to thereby provide a uniform coating of polymer on the support web.

16. The process of claim 15 wherein a homogenizer mixer is positioned upstream of each vent.

17. The process of claim 15 wherein a homogenizer mixer is positioned upstream of the die.

18. The process of claim 15 wherein the aqueous composition is an aqueous emulsion, suspension, or dispersion of a pressure-sensitive adhesive.

19. The process of claim 15 wherein the aqueous composition introduced into the feed unit in step (A) contains from about 20% to about 60% of water.

20. The process of claim 15 wherein substantially all of the water is removed from the composition so that a water-free composition is extruded in step (E).

21. The process of claim 15 wherein the pressure is reduced in at least two sections of the extruder sufficiently to evaporate at least a portion of the water in the composition conveyed through each such section.

22. The process of claim 15 wherein the extruder contains a pair of rotating screws.

23. The process of claim 15 wherein the extruder contains a pair of counter-rotating intermeshing screws.

24. A process for producing a coating of a pressure-sensitive adhesive composition onto a support web, said process comprising:

(A) providing an extruder comprising a plurality of interconnecting sections and having at least one upstream section containing a feed unit, at least one downstream section comprising a homogenizer mixer, and at least one downstream section below the homogenizer mixer containing a water removal unit, said downstream water removal unit comprising a barrel section having a vent opening, a vacuum pump, and a duct surrounding the vent opening and extending from the barrel section to the vacuum pump;

(B) introducing into the feed unit or units of the extruder, an aqueous pressure-sensitive adhesive composition comprising water and a pressure-sensitive adhesive polymer, said water being present in an amount of from about 20% to about 60% by weight of the adhesive composition;

(C) conveying the composition through the extruder;

(D) maintaining the adhesive composition at a temperature which facilitates vaporization of at least a portion of the water as the composition is conveyed through the extruder; and (E) activating the vacuum pump to reduce the pressure in the barrel section of the water removal unit or units sufficiently to evaporate at least a portion of the water in the adhesive composition conveyed through that section to form a water-reduced adhesive composition; and (F) extruding the pressure-sensitive adhesive composition through a die onto a support web to provide a uniform coating of pressure-sensitive adhesive on the support web.

25. The process of claim 24 wherein the extruder contains a pair of counter-rotating intermeshing screws.

26. The process of claim 24 wherein a homogenizer mixer is positioned immediately upstream of the die.

* * * * *